United States Patent
Dong et al.

(10) Patent No.: US 11,985,202 B1
(45) Date of Patent: May 14, 2024

(54) METHOD FOR ACHIEVING HIGH AVAILABILITY OF SCTP CONNECTION IN A MICROSERVICE SYSTEM

(71) Applicant: Hong Kong Applied Science and Technology Research Institute Company Limited, Hong Kong (HK)

(72) Inventors: Ying Dong, Hong Kong (HK); Xiaodong Wang, Hong Kong (HK); Yau Yau Yolanda Tsang, Hong Kong (HK); Simon Yee Wong, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/315,510

(22) Filed: May 11, 2023

(51) Int. Cl.
*H04L 67/51* (2022.01)
*H04L 65/1101* (2022.01)

(52) U.S. Cl.
CPC .......... *H04L 67/51* (2022.05); *H04L 65/1101* (2022.05)

(58) Field of Classification Search
None
See application file for complete search history.

(56) References Cited

U.S. PATENT DOCUMENTS

| 9,032,240 B2 | 5/2015 | Reddy Sirigiri et al. |
| 10,656,929 B2 | 5/2020 | Jamjoom et al. |

(Continued)

FOREIGN PATENT DOCUMENTS

| CN | 111757389 A | 10/2020 |
| CN | 114189566 A | 3/2022 |
| WO | 2012120474 A1 | 9/2012 |
| WO | 2019056206 A1 | 3/2019 |

OTHER PUBLICATIONS

"Stream Control Transmission Protocol", https://en.wikipedia.org/wiki/Stream_Control_Transmission_Protocol, Oct. 2000.

(Continued)

*Primary Examiner* — Atta Khan
(74) *Attorney, Agent, or Firm* — Idea Intellectual Limited; Margaret A. Burke; Sam T. Yip

(57) ABSTRACT

The present invention provides a method for achieving high availability of stream control transport protocol (SCTP) connection in a microservice system. The microservice system comprises at least one access network and a core network. The access network includes at least one base station comprising at least one SCTP peer. The core network includes at least one non-SCTP-capable microservice instance acting as a SCTP service client, multiple SCTP-capable microservice instances, a service node manager and a service delegator. The method comprises: tagging each of the SCTP-capable microservice instances with a SCTP-service label; periodically scanning the microservice system, by the service node manager, to detect alive SCTP-capable microservice instances; dynamically maintaining, by the service node manager, a backend list of alive SCTP-capable microservice instances; and selecting, by the service delegator, an alive SCTP service instance from the maintained backend list according to a selection rule whenever a SCTP service request is received.

12 Claims, 6 Drawing Sheets

(56) References Cited

U.S. PATENT DOCUMENTS

| | | | |
|---|---|---|---|
| 2004/0205190 A1* | 10/2004 | Chong | H04L 69/40 709/225 |
| 2012/0233240 A1 | 9/2012 | Chatilla et al. | |
| 2015/0181445 A1* | 6/2015 | Godin | H04W 24/04 370/254 |
| 2020/0042365 A1 | 2/2020 | Tanna et al. | |
| 2021/0136844 A1 | 5/2021 | Zee et al. | |
| 2021/0392477 A1 | 12/2021 | Taft et al. | |

OTHER PUBLICATIONS

Mohammed Atiquzzaman et al., "Evaluation of SCTP Multistreaming over Wireless/Satellite Links", Proceedings. 12th International Conference on Computer Communications and Networks, Institute of Electrical and Electronics Engineers, Oct. 2003, pp. 591-594.

"What is the 5G Service-Based Architecture (SBA)?", https://www.metaswitch.com/knowledge-center/reference/what-is-the-5g-service-based-architecture-sba, 2020.

Maryna Demchenko, "Microservices vs. Monolithic: Which Architecture Suits Best for Your Project?", htttps://ncube.com/blog/microservices-vs-monolithic-which-architecture-suits-best-for-your-project, NCube, Apr. 28, 2020.

Vamsi Chemitiganti, "5G Core (5GC)—Platform Architecture", https://www.vamsitalkstech.com/5g/5g-core-5gc-platform-architecture/, Vamsi Talks Tech, Jun. 7, 2021.

Ericsson, "Support of multiple signalling TNL associations per AMF", 3GPP TSG-RAN WG3 Meeting #97, 3rd Generation Partnership Project, Aug. 25, 2017, R3-173212.

International Search Report and Written Opinion of corresponding PCT application No. PCT/CN2023/094545 dated Dec. 7, 2023.

* cited by examiner

METHOD FOR ACHIEVING HIGH AVAILABILITY OF SCTP CONNECTION IN A MICROSERVICE SYSTEM

FIELD OF THE INVENTION

The present invention generally relates to stream control transport protocol (SCTP) for computer networking. More specifically, the present invention relates to a method of achieving high availability of SCTP connection in a microservice system.

BACKGROUND OF THE INVENTION

SCTP is a computer networking communications protocol in the transport layer of the internet protocol suite. In a SCTP connection, two peers establish a SCTP association and messages are reliably transmitted in the SCTP association between the peers. SCTP has been adopted in wireless communication system for reliable signaling transmission between radio access network (RAN) and core network in 4G and 5G. In 5G network system, SCTP is used to transmit control signaling messages between node base station (gNB) for RAN and access management function (AMF) in 5G Core (5GC). In the evolution of 5G systems, the 5GC has been designed with a service-based architecture whereby each network function (NF) offers services to other NFs via HTTP/2 protocol. Each NF service is independent and reusable, acting as a microservice. In moving 5GC to microservice system, SCTP shall be applied to provide SCTP connection between microservice instances at the 5GC and end users at RAN. The high availability of SCTP connection service is very crucial in providing connection between RAN and 5GC with reliable signaling transmission.

To improve availability of SCTP connection within a single SCTP association, various approaches such as multiple streaming and multihoming have been developed. A SCTP association may include multiple streams. During the SCTP association setup, the usage and the number of the streams are negotiated between the peers. A SCTP endpoint may have multiple IP addresses known as multihoming. Multihoming is the ability of a SCTP association to support multiple IP paths to its peer endpoint. It makes the association more fault-tolerant against physical network failures. In microservice system, multiple SCTP-capable microservice instances are set up for a AMF node providing multiple SCTP associations between SCTP peer at RAN and Core, the availability of SCTP connection can be improved by redundancy of the associations.

SCTP-capable microservice instances having SCTP endpoints are able to establish SCTP connection with the SCTP peers at base stations at the RAN so as to act as SCTP service instances. SCTP service instances could provide SCTP connection service to non-SCTP-capable microservice instances which have no SCTP endpoint such that those non-SCTP-capable microservice instances can deliver application data to the SCTP peer at base stations. SCTP service instances can be dynamically configured and added at the 5GC. Each SCTP peer at the RAN has the capability of establishing multiple SCTP associations and switching a user associated signalling data among the multiple existing associations. However, a non-SCTP-capable microservice instance is unaware of an existing SCTP service instances nor a newly added SCTP service instances until it receives a signalling request from the SCTP service instance. Thus, when a SCTP association being used by a non-SCTP-capable microservice instance becomes unavailable, the non-SCTP-capable microservice instance may not be unable to switch to another SCTP association.

Therefore, there is a need in the art for a method or system to solve the above-said problem of unavailability and discontinuity of SCTP service to achieve high availability of SCTP service in microservice systems.

SUMMARY OF THE INVENTION

In accordance with a first aspect of the present invention, provided is a method for achieving high availability of stream control transport protocol (SCTP) connection in a microservice system. The microservice system comprises at least one access network and a core network. The access network includes at least one SCTP peer. The core network includes at least one non-SCTP-capable microservice instance, two or more SCTP-capable microservice instances, a service node manager and a service delegator.

The method comprises: tagging each of the two or more SCTP-capable microservice instances with a SCTP-service label; periodically scanning the microservice system, by the service node manager, to detect alive SCTP-capable microservice instances; and dynamically maintaining, by the service node manager, a backend list of alive SCTP-capable microservice instances.

In one embodiment, the backend list is dynamically maintained by adding, by the service node manager, a newly detected SCTP-capable microservice instance into the backend list. The backend list is further dynamically maintained by removing, by the service node manager, a listed SCTP-capable microservice instance from the backend list when the listed SCTP-capable microservice instance is broken down.

In one embodiment, the SCTP peer has a unique endpoint for establishing two or more SCTP associations with the two or more SCTP-capable microservice instances respectively. Each of the SCTP-capable microservice instances has a unique endpoint for establishing a SCTP association with the SCTP peer.

In one embodiment, the method further comprises sending, by the non-SCTP-capable microservice instance, a SCTP service request and application data to the service delegator for transporting the application data to an application of the SCTP peer; selecting, by the service delegator, an alive SCTP-capable microservice instance from the backend list according to a selection rule to provide SCTP service; packaging, by the selected SCTP-capable microservice instance, the application data into a SCTP message; and transmitting, by the selected SCTP-capable microservice instance, the SCTP message to the SCTP peer through a SCTP association established between the SCTP peer and the selected SCTP service instance.

In accordance with a second aspect of the present invention, a microservice system with high availability of stream control transport protocol (SCTP) connection is implemented with an embodiment of the present invention. The microservice system comprises: at least one access network having at least one base station comprising at least one SCTP peer; and a core network. The core network comprises: at least one non-SCTP-capable microservice instance; two or more SCTP-capable microservice instances, each SCTP-capable microservice instance being tagged with a SCTP-service label; and a service delegator that includes a service node manager. The service node manager is configured to periodically scan the microservice system to detect alive SCTP-capable microservice instances and dynamically maintain a backend list of alive SCTP-capable microservice instances.

BRIEF DESCRIPTION OF THE DRAWINGS

Embodiments of the invention are described in more details hereinafter with reference to the drawings, in which.

DETAILED DESCRIPTION

In the following description, apparatuses and methods for achieving high availability of SCTP connection in a microservice system and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

While implementations of the embodiments of the present invention are particularly suitable for 5G communication systems, the embodiments of the present invention are readily adaptable to be implemented in other types of microservice system without undue experimentation.

Figure 1:
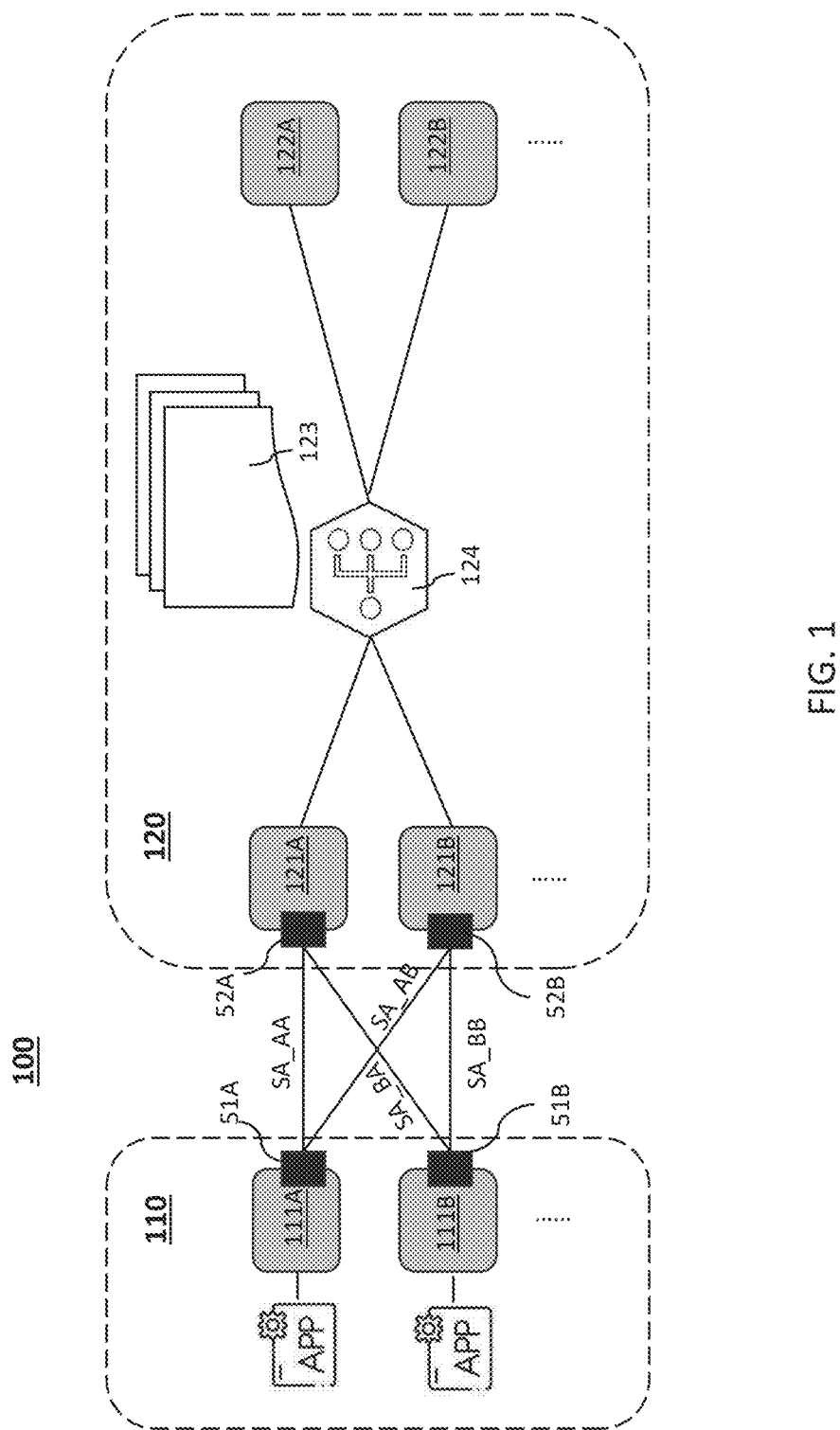
FIG. 1 depicts a schematic diagram of a microservice system with high availability of SCTP connection in accordance with an embodiment of the present invention.

FIG. 1 illustrates a microservice system 100 with high availability of SCTP connection in accordance with an embodiment of the present invention. Referring to FIG. 1, the microservice system 100 comprises at least one access network 110 and a core network 120. The access network 110 may be a radio access network (RAN). The access network 110 includes a plurality of SCTP peers 111A, 111B, . . . . The core network 120 includes a plurality of SCTP-capable microservice instances 121A, 121B, . . . , a plurality of non-SCTP-capable microservice instance 122A, 122B, . . . , at least one service node manager 123 and at least one service delegator 124.

Each of the SCTP-capable microservice instances 121A, 121B, . . . may be tagged with a SCTP service label (e.g., "SctpService") to indicate their common attribute of being capable to provide SCTP service.

Each of the SCTP peers 111A, 111B, . . . may have a unique endpoint 51A, 51B, . . . for establishing multiple SCTP associations SA_AA, SA_AB, SA_BA, SA_BB, . . . with the SCTP-capable microservice instances 121A, 121B, . . . , respectively. In other words, each SCTP peer may have multiple associated SCTP-capable microservice instances and be able to switch to any one of the associated SCTP-capable microservice instances such that high availability of SCTP service can be achieved.

Similarly, each of the SCTP-capable microservice instances 121A, 121B, . . . may have a unique endpoint 52A, 52B, . . . for establishing SCTP associations SA_AA, SA_AB, SA_BA, SA_BB with the SCTP peers 111A, 111B, . . . , respectively.

The service node manager 123 may be configured to periodically scan the microservice system 120 to detect alive SCTP-capable microservice instances for use.

The service node manager 123 may be further configured to dynamically maintain a backend list of the SCTP-capable microservice instances by: adding a newly detected SCTP-capable microservice instances into the backend list; and removing a listed SCTP-capable microservice instances from the backend list if the listed SCTP-capable microservice instance is broken down or unavailable for use due to network failure.

Each of the non-SCTP-capable microservice instances 122A, 122B, . . . is communicable with the service delegator 124 via an internal protocol (e.g., HTTP/2) and configured to use the service delegator to forward application data to applications on top of user equipment in SCTP peers.

Figure 2:
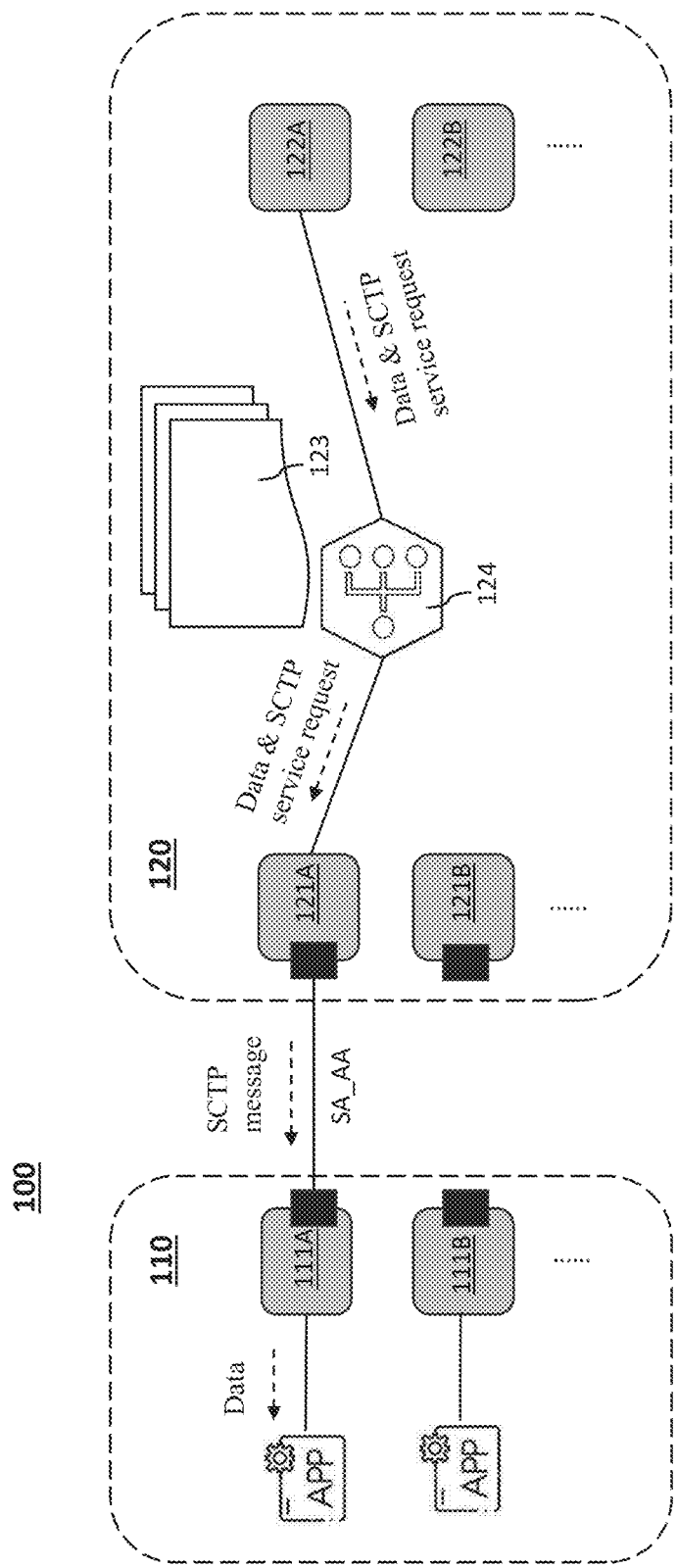
FIG. 2 depicts a schematic diagram of the microservice system with an exemplary outbound SCTP service request traffic under normal circumstances.
Figure 3:
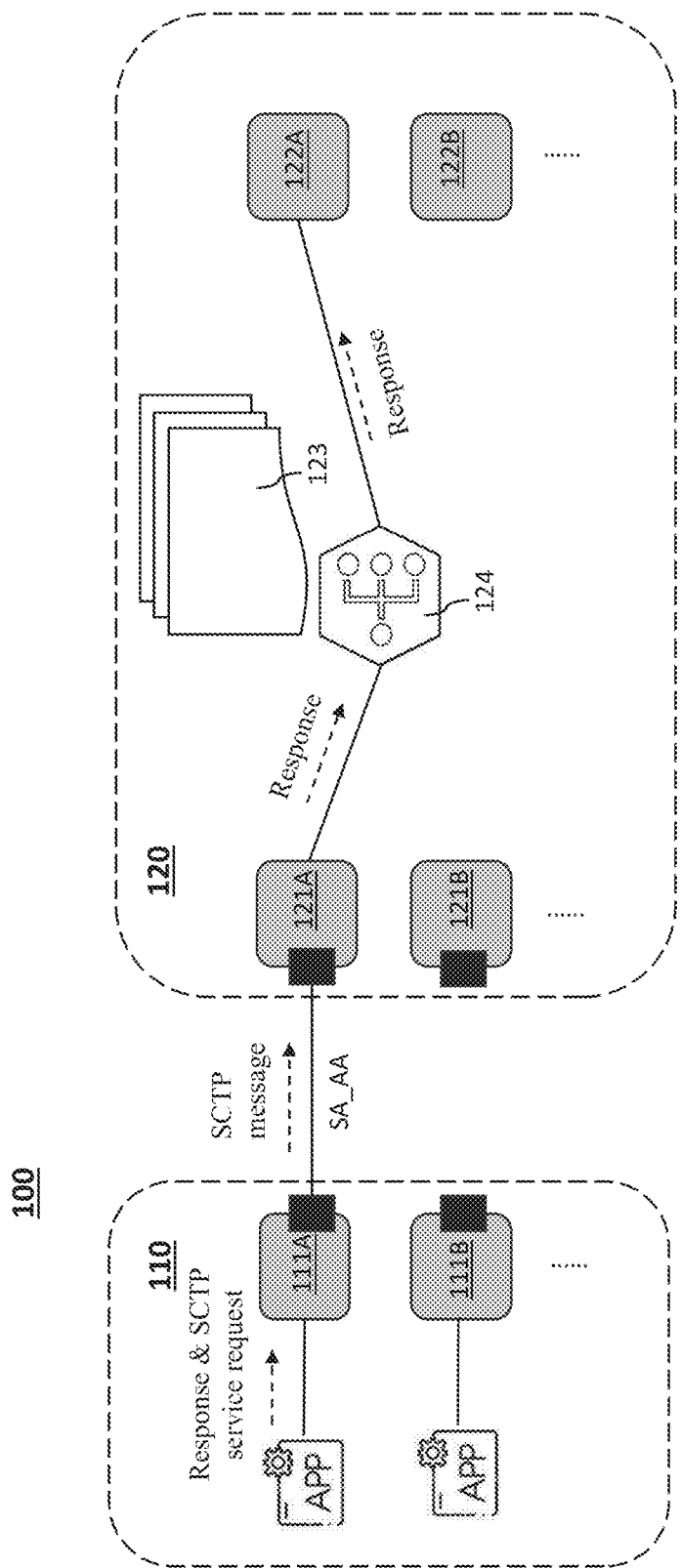
FIG. 3 depicts a schematic diagram of the microservice system with an exemplary outbound SCTP service response traffic under normal circumstances.

FIGS. 2 and 3 illustrate the exemplary outbound SCTP service request and response traffics in the microservice system under normal circumstance, respectively. Referring to FIG. 2, for transporting application data from a non-SCTP-capable microservice instance (i.e., 122A) to an application of a SCTP peer (i.e., 111A), the non-SCTP-capable microservice instance 122A acts as a SCTP service client to send a SCTP service request and the application data to the service delegator 124. When the service delegator receives the SCTP service request and the application data, the service delegator is configured to select an alive SCTP service instance (i.e., 121A) from the maintained backend list according to a selection rule and the service delegator 124 is configured to forward the SCTP service request and the application data to the selected SCTP service instance 121A.

The selected SCTP service instance 121A is configured to package the application data into a SCTP message and transmit the SCTP message to the SCTP peer 111A through the SCTP association SA_AA established between the SCTP peer 111A and the selected SCTP service instance 121A. The SCTP peer 111A is configured to forward the application data to the application.

Referring to FIG. 3 for the following description. For transporting application response from the application in the SCTP peer 111A to the SCTP service client 122A, the same route as shown in FIG. 2 may be used. The application sends the application response to the SCTP peer 111A. When the SCTP peer 111A receives the application response, it packages the application response into a SCTP message and transmit the SCTP message to the originally SCTP association where the SCTP service request is received, i.e. the association established with the instance 121A. The SCTP service instance, i.e. 121A, forwards the application response to the service delegator 124. The service delegator 124 forwards the application response to the originally requesting non-SCTP-capable microservice instance (i.e., SCTP service client) 122A.

In one embodiment, the SCTP service client may be an access management service and the application data may be next generation application protocol (NGAP) signalling messages.

Figure 4:
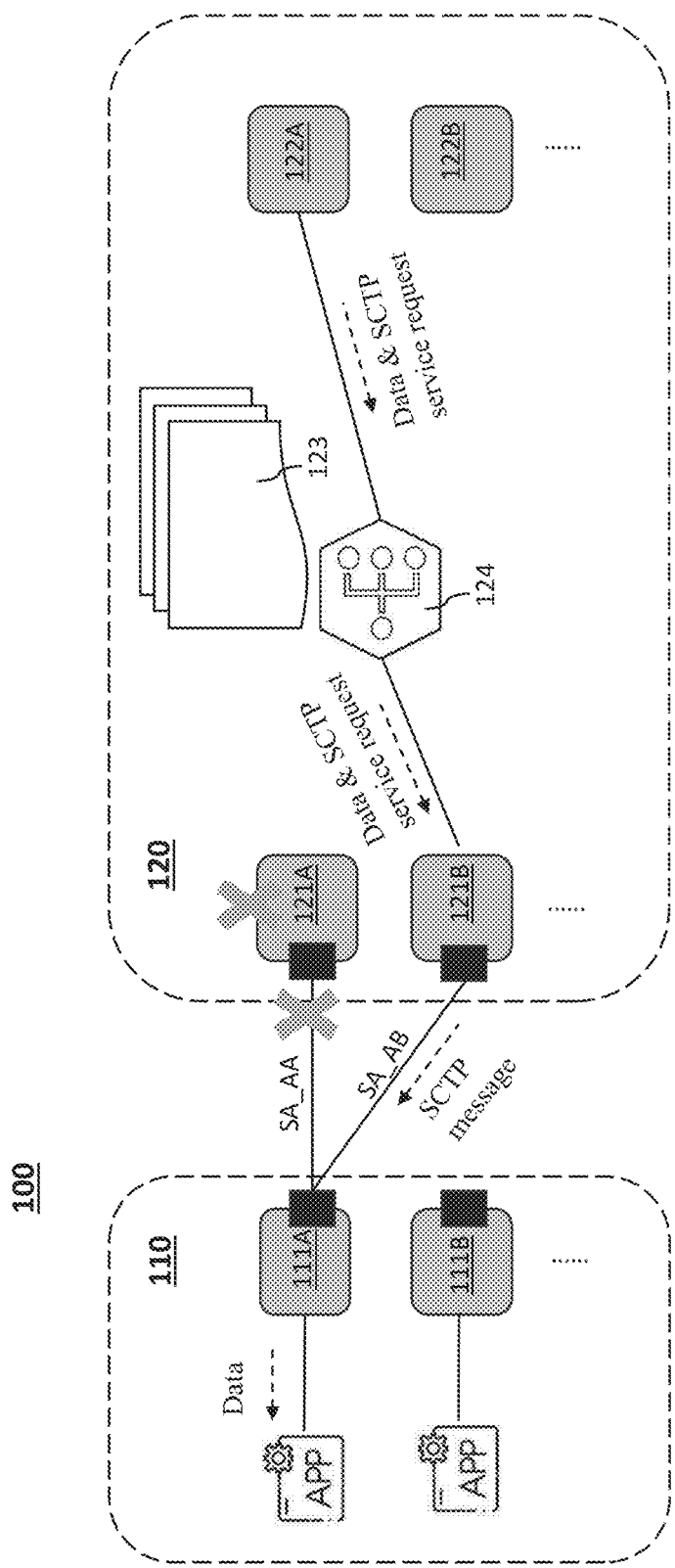
FIG. 4 depicts a schematic diagram of the microservice system with an exemplary outbound SCTP service request traffic under the condition of that the originally selected SCTP service instance and the SCTP association become unavailable due to network failure.

FIG. 4 illustrates the exemplary outbound SCTP service request traffic in the microservice system under the condition of that the originally selected SCTP service instance 121A and the SCTP association SA_AA become unavailable due to network failure. As the backend list is dynamically maintained by the service node manager 123, the SCTP service instance 121A is removed by the service node manager from the backend list.

Referring to FIG. 4 for the following description. For transporting application data to the application on top of SCTP peer 111A, the SCTP service client 122A is similarly configured to send a SCTP service request and the application data to the service delegator 124. When the service delegator receives the SCTP service request and the application data, the originally selected SCTP service instance 121A is no longer in the maintained backend list. The service delegator is then configured to select another alive SCTP service instance, say, 121B, from the maintained backend list according to a selection rule and the service delegator 124 is configured to forward the SCTP service request and the application data to the selected SCTP service instance 121B.

The newly selected SCTP service instance 121B packages the application data into a SCTP message and transmit the SCTP message to the SCTP peer 111A through the SCTP association SA_AB established between the SCTP peer 111A and the newly selected SCTP service instance 121B. The SCTP peer 111A forwards the application data to the application.

Figure 5:
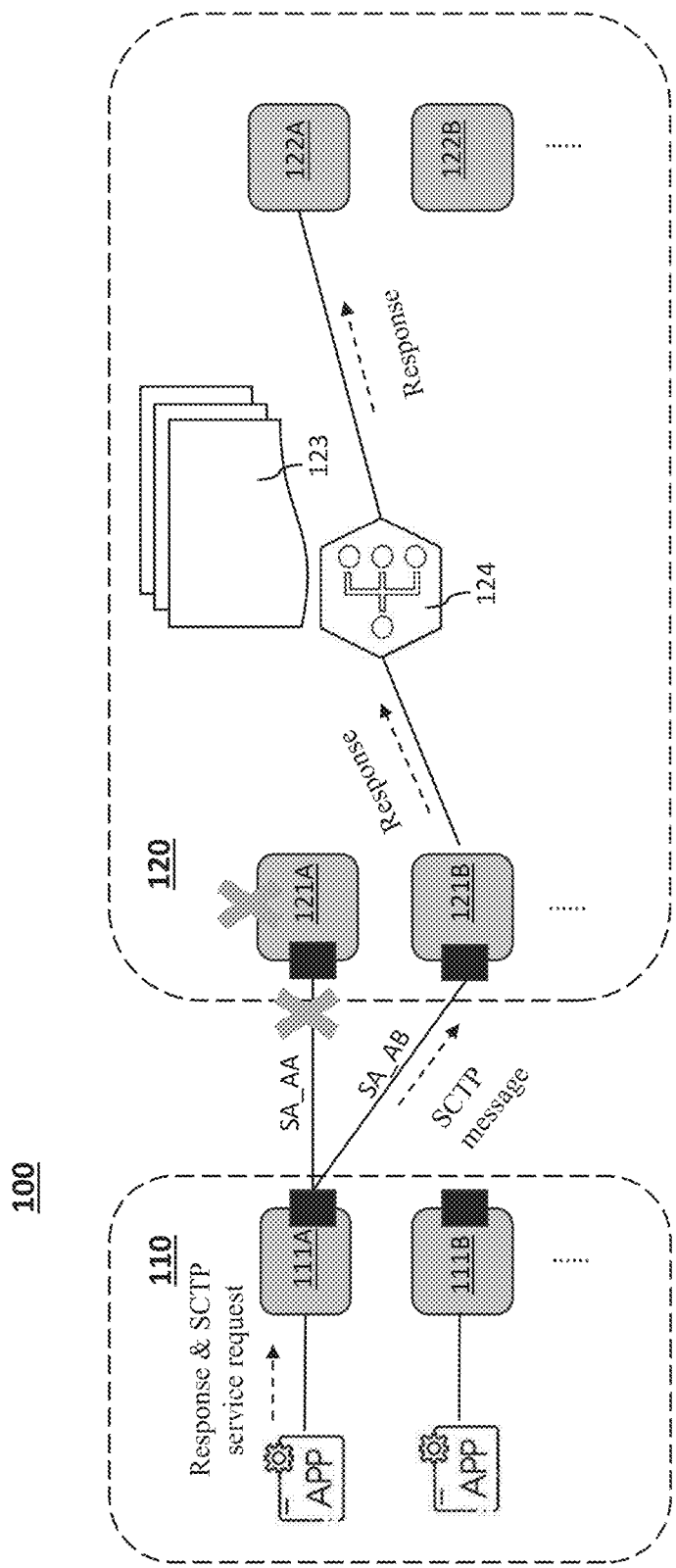
FIG. 5 depicts a schematic diagram of the microservice system with an exemplary outbound SCTP service response traffic under the condition of that the originally selected SCTP service instance and the SCTP association become unavailable due to network failure.

Referring to FIG. 5 for the following description. For transporting application response from the application in the SCTP peer 111A to the non-SCTP-capable microservice instance 122A, the same route as shown in FIG. 4 may be used. The application is configured to send the application response to the SCTP peer 111A. When the SCTP peer 111A receives the application response, it packages the application response into a SCTP message and transmits the SCTP message to the newly selected SCTP service instance 121B. The newly selected SCTP service instance 121B forwards the application response to the service delegator 124. The service delegator 124 is configured to forward the application response to the non-SCTP-capable microservice instance 122A.

Figure 6:
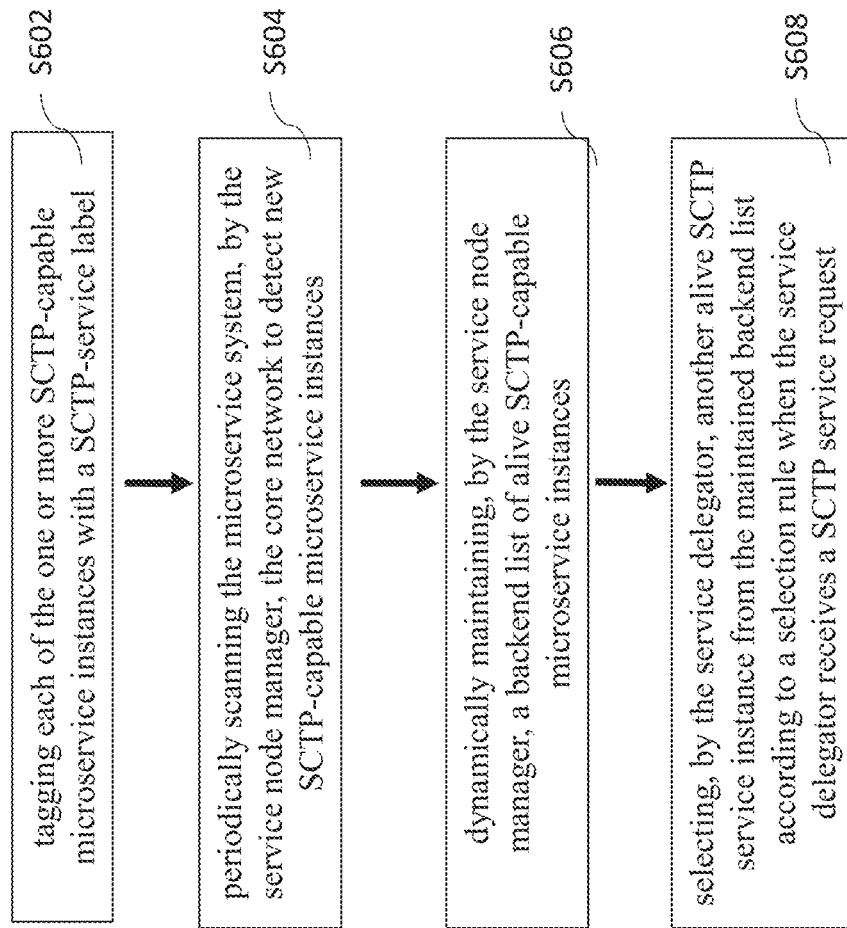
FIG. 6 depicts a flow diagram of a method of achieving high availability of SCTP connection in a microservice system in accordance with one embodiment of the present invention.

FIG. 6 illustrates the process flow of a method of achieving high availability of SCTP connection in a microservice system in accordance with one embodiment of the present invention. The microservice system may comprise at least one access network and a core network, the access network including at least one SCTP peer, the core network including at least one non-SCTP-capable microservice instance acting as a SCTP service client, two or more SCTP-capable microservice instances, a service node manager and a service delegator. Referring to FIG. 6, the method comprises:

S602: tagging each of the two or more SCTP-capable microservice instances with a SCTP-service label;

S604: periodically scanning the microservice system, by the service node manager, to detect alive SCTP-capable microservice instances; and S606: dynamically maintaining, by the service node manager, a backend list of alive SCTP-capable microservice instances.

S608: selecting, by the service delegator, another alive SCTP service instance from the maintained backend list according to a selection rule when the service delegator receives a SCTP service request.

In one embodiment, the backend list is dynamically maintained by adding, by the service node manager, a newly detected SCTP-capable microservice instance into the backend list; and removing, by the service node manager, a listed SCTP-capable microservice instance from the backend list when the listed SCTP-capable microservice instance is broken down.

The system and method in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for achieving high availability of stream control transport protocol (SCTP) connection in a microservice system comprising at least one access network and a core network, the access network having at least one base station including at least one SCTP peer, the core network deployed in a microservice system including at least one non-SCTP-capable microservice instance, two or more SCTP-capable microservice instances, a service node manager and a service delegator, the method comprises:
- tagging each of the two or more SCTP-capable microservice instances with a SCTP-service label;
- periodically scanning the microservice system, by the service node manager of the microservice system, to detect alive SCTP-capable microservice instances;
- dynamically maintaining, by the service node manager, a backend list of alive SCTP-capable microservice instances, the dynamic maintenance comprising:
- adding to the backend list a newly detected SCTP-capable microservice instance;
- removing a listed SCTP-capable microservice instance from the backend list when the listed SCR-capable microservice instance is broken down; and
- sending, by the non-SCTP-capable microservice instance acting as a SCTP service client, a SCTP service request and application data to the service delegator for transporting the application data to an application of the SCTP peer.

2. The method of claim 1, wherein the SCTP peer has a unique endpoint and is capable of establishing two or more SCTP associations with the two or more SCTP-capable microservice instances respectively.

3. The method of claim 2, wherein each of the two or more SCTP-capable microservice instances has a unique endpoint for establishing a SCTP association with the SCTP peer.

4. The method of claim 1, further comprising selecting, by the service delegator, an alive SCTP-capable microservice instance from the backend list according to a selection rule to provide SCTP service.

5. The method of claim 4, further comprising packaging, by the selected SCTP-capable microservice instance, the application data into a SCTP message.

6. The method of claim 5, further comprising transmitting, by the selected SCTP-capable microservice instance, the SCTP message to the SCTP peer through a SCTP association established between the SCTP peer and the selected SCTP service instance.

7. A microservice system with high availability of stream control transport protocol (SCTP) connection, comprising:
- at least one access network including at least one base station comprising at least one SCTP peer; and
- a core network deployed in a microservice system including:
  - at least one non-SCTP-capable microservice instance;
  - two or more SCTP-capable microservice instances, each tagged with a SCTP-service label;
  - a service delegator including a service node manager configured to:
    - periodically scan the core network to detect alive SCTP-capable microservice instances; and
    - dynamically maintain a backend list of alive SCTP-capable microservice instances by:
      - adding to the backend list a newly detected SCTP-capable microservice instance;
      - removing a listed SCTP-capable microservice instance from the backend list when the listed SCTP-capable microservice instance is broken down; and
      - sending, by the non-SCTP-capable microservice instance acting as a SCTP service client, a SCTP service request and application data to the service delegator for transporting the application data to an application of the SCTP peer.

8. The microservice system of claim 7, wherein the SCTP peer has a unique endpoint for establishing two or more SCTP associations with the two or more SCTP-capable microservice instances respectively.

9. The microservice system of claim 8, wherein each of the two or more SCTP-capable microservice instances has a unique endpoint for establishing a SCTP association with the SCTP peer.

10. The microservice system of claim 7, wherein the service delegator is configured to select an alive SCTP-capable microservice instance from the backend list according to a selection rule to provide SCTP service.

11. The microservice system of claim 10, wherein the selected SCTP-capable microservice instance is configured to package the application data into a SCTP message.

12. The microservice system of claim 11, the selected SCTP-capable microservice instance is further configured to transmit the SCTP message to the SCTP peer through a SCTP association established between the SCTP peer and the selected SCTP service instance.

* * * * *